(12) United States Patent
Lee et al.

(10) Patent No.: US 12,041,499 B2
(45) Date of Patent: Jul. 16, 2024

(54) METHOD AND APPARATUS FOR PERFORMING MEASUREMENT IN WIRELESS COMMUNICATION SYSTEM

(71) Applicant: LG ELECTRONICS INC., Seoul (KR)

(72) Inventors: Oanyong Lee, Seoul (KR); Sunghoon Jung, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 445 days.

(21) Appl. No.: 17/422,687

(22) PCT Filed: Mar. 9, 2020

(86) PCT No.: PCT/KR2020/003227
§ 371 (c)(1),
(2) Date: Jul. 13, 2021

(87) PCT Pub. No.: WO2020/197125
PCT Pub. Date: Oct. 1, 2020

(65) Prior Publication Data
US 2022/0116837 A1 Apr. 14, 2022

Related U.S. Application Data

(60) Provisional application No. 62/845,848, filed on May 9, 2019, provisional application No. 62/845,846, filed
(Continued)

(30) Foreign Application Priority Data

| Mar. 25, 2019 | (KR) | 10-2019-0033780 |
| Mar. 25, 2019 | (KR) | 10-2019-0033802 |
| Mar. 25, 2019 | (KR) | 10-2019-0033845 |

(51) Int. Cl.
*H04W 24/10* (2009.01)
*H04B 17/318* (2015.01)
*H04W 36/00* (2009.01)

(52) U.S. Cl.
CPC ...... *H04W 36/0094* (2013.01); *H04B 17/318* (2015.01); *H04W 24/10* (2013.01); *H04W 36/0058* (2018.08)

(58) Field of Classification Search
CPC ....... H04W 76/28; H04W 4/40; H04W 36/04; H04W 52/40; H04W 72/542;
(Continued)

(56) References Cited

U.S. PATENT DOCUMENTS

2015/0195758 A1* 7/2015 Kim ............... H04W 36/0088
370/252
2016/0302094 A1 10/2016 Yum et al.
(Continued)

OTHER PUBLICATIONS

Vivo, Summary #5 of UE power Consumption Reduction in RRM Measurements, R1-1903805, 3GPP TSG RAN WG1 Meeting #96, Athens, Greece, Mar. 3, 2019, pp. 4-5, 14-21, 41-49.
(Continued)

*Primary Examiner* — Tu X Nguyen
(74) *Attorney, Agent, or Firm* — BRYAN CAVE LEIGHTON PAISNER LLP

(57) ABSTRACT

The present disclosure relates to method and apparatus for performing a measurement wireless communications. According to an embodiment of the present disclosure, a method performed by a wireless device comprises: receiving measurement configurations from a network, each of the measurement configurations mapping to a corresponding signal quality range; measuring a first signal quality for a serving cell at a first time point and a second signal quality for the serving cell at a second time point after the first time point; identifying a signal quality range to which a difference
(Continued)

between the first signal quality and the second signal quality belongs; and performing a measurement based on a measurement configuration mapped to the identified signal quality range.

14 Claims, 18 Drawing Sheets

Related U.S. Application Data on May 9, 2019, provisional application No. 62/845,847, filed on May 9, 2019.

(58) Field of Classification Search
CPC ..... H04W 48/10; H04W 36/30; H04W 52/24; H04W 36/00; H04W 24/10
See application file for complete search history.

(56) References Cited

U.S. PATENT DOCUMENTS

2017/0078903 A1  3/2017  Kusashima et al.
2018/0352513 A1  12/2018  Jamadagni et al.

OTHER PUBLICATIONS

Mediatek Inc., NR RRM UE power saving, R1-1901805, 3GPP TSG RAN WG1 Meeting RAN1 #96, Athens, Greece, Feb. 16, 2019, pp. 1, 4.
3GPP TS 38.133 V15.4.0.

* cited by examiner

METHOD AND APPARATUS FOR PERFORMING MEASUREMENT IN WIRELESS COMMUNICATION SYSTEM

This application is the National Stage filing under 35 U.S.C. 371 of International Application No. PCT/KR2020/003227, filed on Mar. 9, 2020, which claims priority to U.S. Provisional Application No. 62/845,847 filed on May 9, 2019; U.S. Provisional Application No. 62/845,846 filed on May 9, 2019 and U.S. Provisional Application No. 62/845,848 filed on May 9, 2019, which claims priority to Korean Patent Application No. 10-2019-0033780 filed on Mar. 25, 2019; Korean Patent Application No. 10-2019-0033845 filed on Mar. 25, 2019 and Korean Patent Application No. 10-2019-0033802 filed on Mar. 25, 2019, the contents of which are all hereby incorporated by reference herein in their entirety.

BACKGROUND OF THE DISCLOSURE

Field of the Disclosure

The present disclosure relates to method and apparatus for performing a measurement wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication environment, there might be some cases a UE should perform a measurement. For example, the UE may perform a measurement on a serving cell and/or neighbor cell(s) for a mobility of the UE. During the measurement, the UE may apply a measurement rule that is determined based on based on information provided by a network. The example of the measurement rule may comprise at least one of a measurement period, a measurement gap, a measurement gap repetition period, a cell detection requirement, or a measurement accuracy requirement.

SUMMARY OF THE DISCLOSURE

Technical Problem

An aspect of the present disclosure is to provide method and apparatus for performing a measurement in a wireless communication system.

Another aspect of the present disclosure is to provide method and apparatus for applying a measurement configuration in a wireless communication system.

Another aspect of the present disclosure is to provide method and apparatus for selecting a measurement configuration among a plurality of measurement configurations provided by a network in a wireless communication system.

Another aspect of the present disclosure is to provide method and apparatus for adjusting a measurement rule in a wireless communication system.

Technical Solution

According to an embodiment of the present disclosure, a method performed by a wireless device comprises: receiving measurement configurations from a network, each of the measurement configurations mapping to a corresponding signal quality range; measuring a first signal quality for a serving cell at a first time point and a second signal quality for the serving cell at a second time point after the first time point; identifying a signal quality range to which a difference between the first signal quality and the second signal quality belongs; and performing a measurement based on a measurement configuration mapped to the identified signal quality range.

According to an embodiment of the present disclosure, a wireless device in a wireless communication system comprises: a transceiver; a memory; and at least one processor operatively coupled to the transceiver and the memory, and configured to: control the transceiver to receive measurement configurations from a network, each of the measurement configurations mapping to a corresponding signal quality range, measure a first signal quality for a serving cell at a first time point and a second signal quality for the serving cell at a second time point after the first time point, identify a signal quality range to which a difference between the first signal quality and the second signal quality belongs, and perform a measurement based on a measurement configuration mapped to the identified signal quality range.

According to an embodiment of the present disclosure, a processor for a wireless device in a wireless communication system is configured to control the wireless device to perform operations comprising: receiving measurement configurations from a network, each of the measurement configurations mapping to a corresponding signal quality range; measuring a first signal quality for a serving cell at a first time point and a second signal quality for the serving cell at a second time point after the first time point; identifying a signal quality range to which a difference between the first signal quality and the second signal quality belongs; and performing a measurement based on a measurement configuration mapped to the identified signal quality range.

According to an embodiment of the present disclosure, a computer-readable medium having recorded thereon a program for performing each step of a method on a computer is provided. The method comprises: receiving measurement configurations from a network, each of the measurement configurations mapping to a corresponding signal quality range; measuring a first signal quality for a serving cell at a first time point and a second signal quality for the serving cell at a second time point after the first time point; identifying a signal quality range to which a difference between the first signal quality and the second signal quality belongs; and performing a measurement based on a measurement configuration mapped to the identified signal quality range.

Advantageous Effect

The present disclosure can have various advantageous effects.

For example, a UE may apply a measurement configuration based on a variation of a signal quality for a serving cell so that the UE can flexibly adjust a measurement rule based on how fast the UE moves toward/away from the center of the serving cell.

For example, a UE can flexibly adjust a measurement rule based on a serving cell RSRP variation, which may reflect the variation of a distance between the UE and the serving cell. By adjusting the measurement rule, the UE can relax or tighten the measurement rule even if the serving cell quality is below a certain threshold (e.g., s-MeasureConfig).

For example, a UE may be provided with a plurality of measurement configurations so that the UE can flexibly select a measurement configuration among the plurality of measurement configurations based on a specific condition for the UE (e.g., variation of a signal quality for a serving cell, or how fast the UE moves toward/away from the center of the serving cell).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
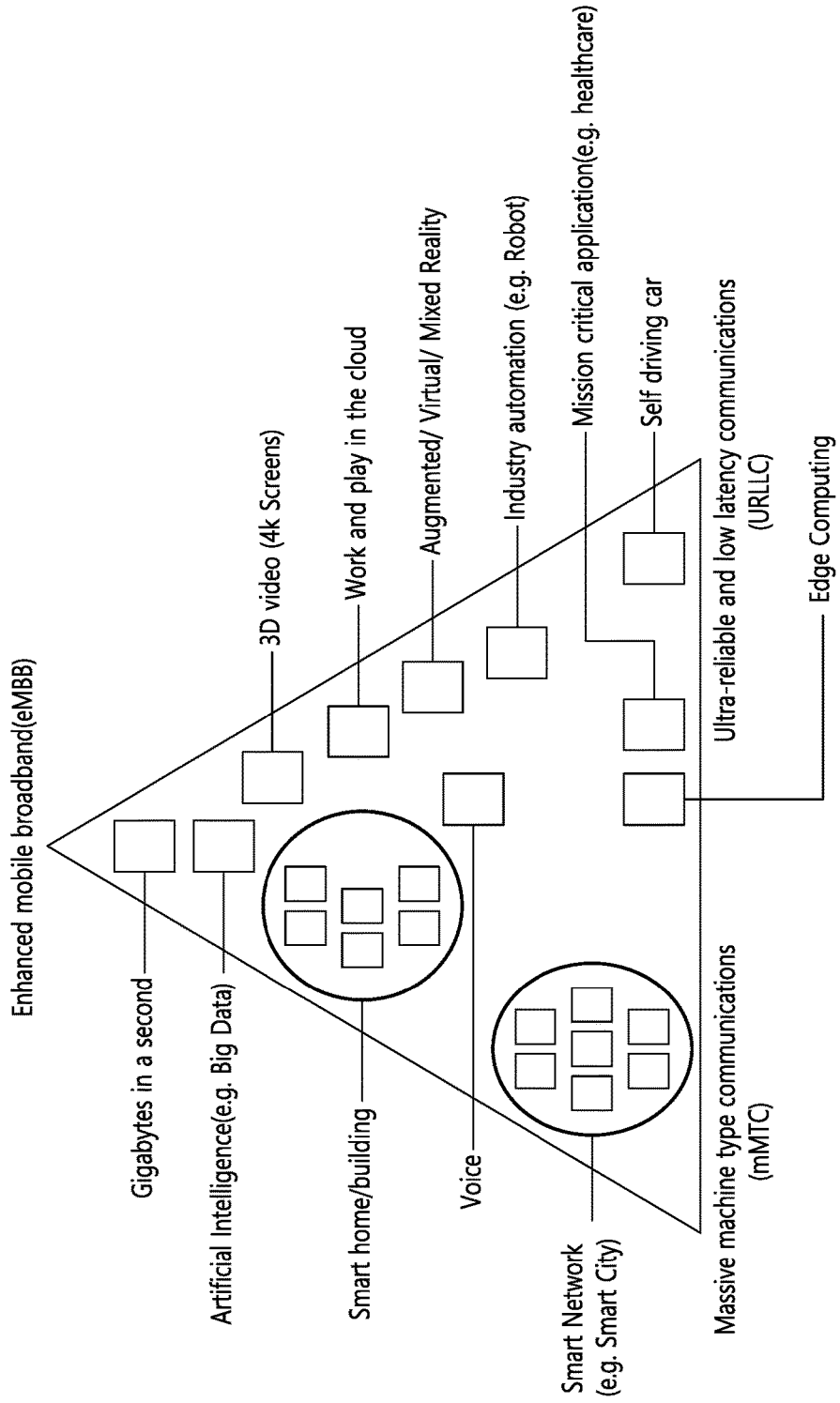
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure may be defined as the followings:

"Measurement rule" refers to a rule that is applied for a UE to perform a measurement. The measurement rule may comprise (or, be determined based on/be related to) at least one of a measurement period, a length of a measurement gap, a measurement gap repetition period, a cell detection requirement, or a measurement type accuracy requirement. Relaxed measurement rule refers to a measurement rule related to a longer measurement period, a shorter measurement gap length, a longer measurement gap repetition period, a relaxed cell detection requirement, and/or a lower measurement accuracy requirement. On the other hand, tight (or, intense) measurement rule refers to a measurement rule related to a shorter measurement period, a longer measurement gap length, a shorter measurement gap repetition period, a tight cell detection requirement, and/or a higher measurement accuracy requirement. Relaxing a measurement rule may comprise applying a measurement rule related to a longer measurement period, a shorter measurement gap length, a longer measurement gap repetition period, a relaxed cell detection requirement, and/or a lower measurement accuracy requirement. Tightening (or, intensifying) a measurement rule may comprise applying a measurement rule related to a shorter measurement period, a longer measurement gap length, a shorter measurement gap repetition period, a tight cell detection requirement, and/or a higher measurement accuracy requirement.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
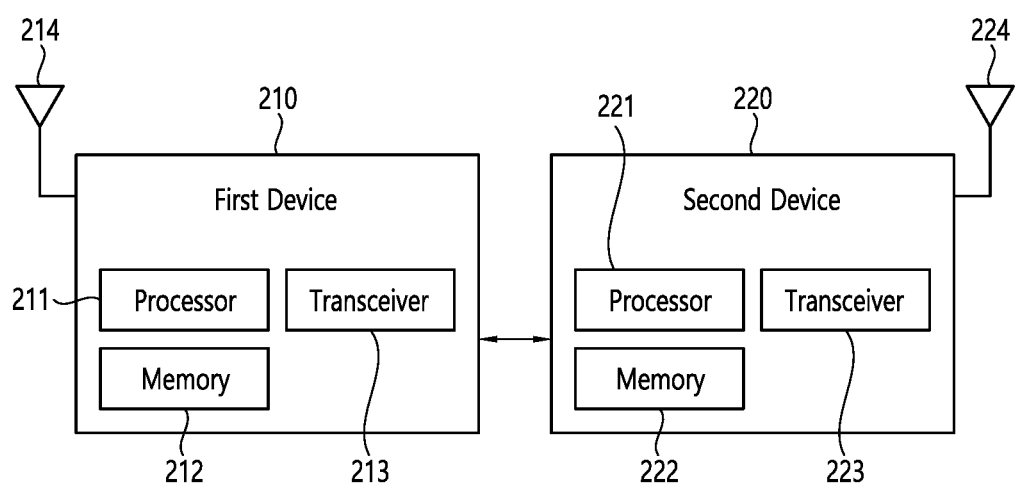
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
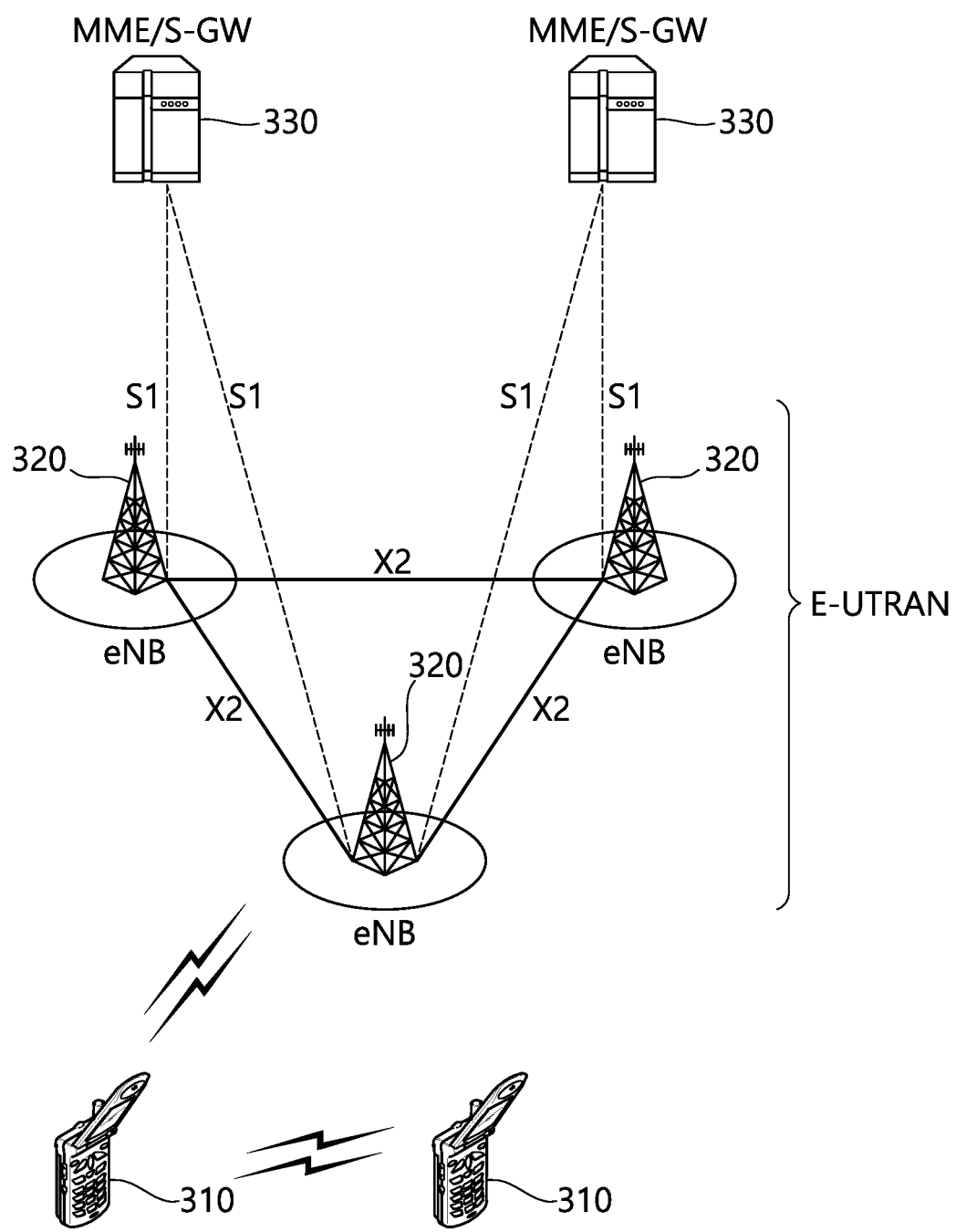
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
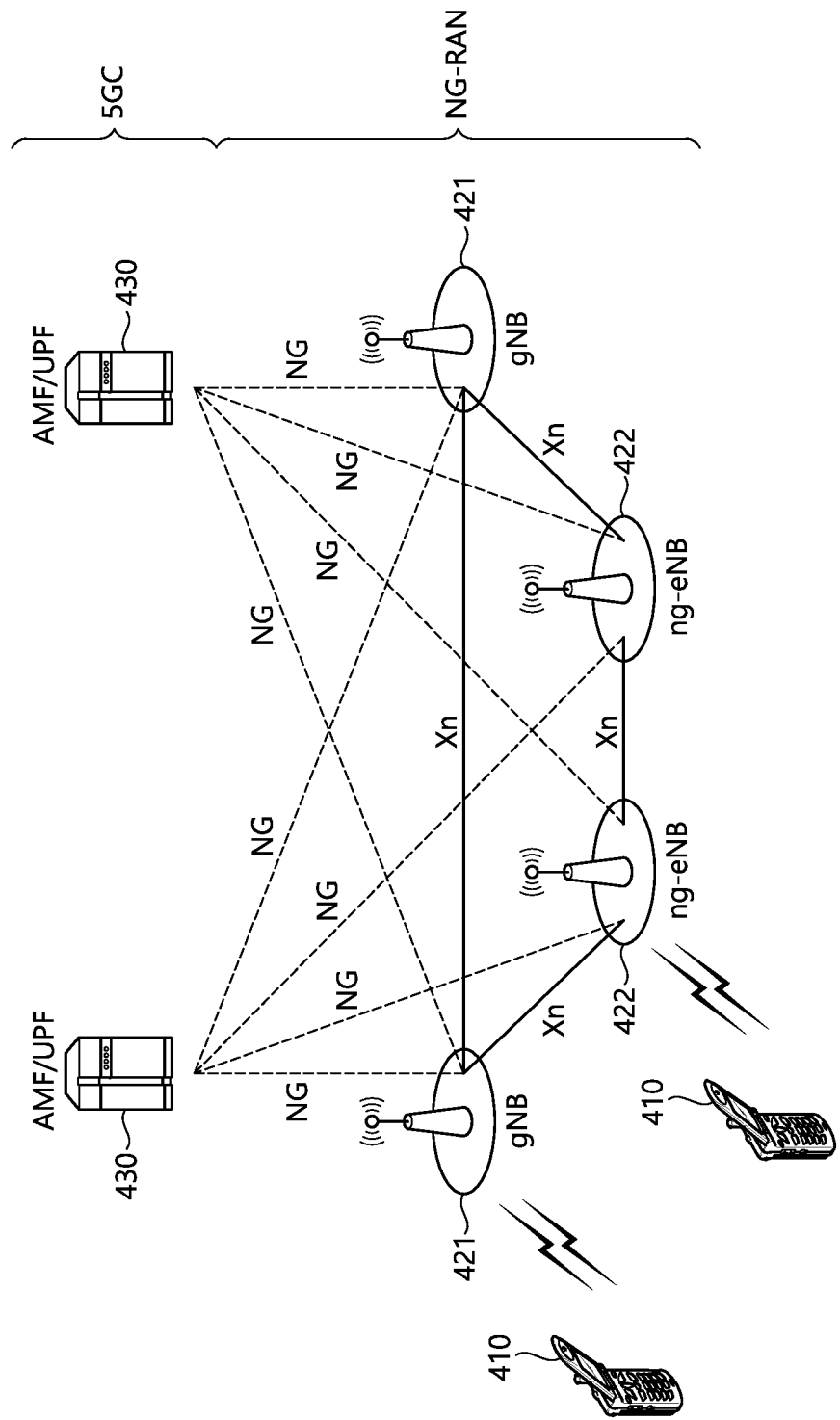
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
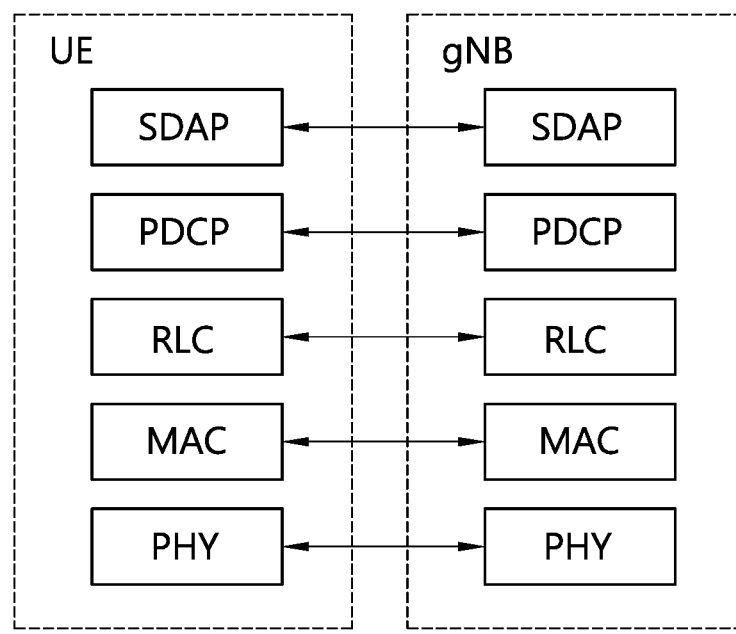
FIG. 5 shows a block diagram of a user plane protocol stack to which the technical features of the present disclosure can be applied.
Figure 6:
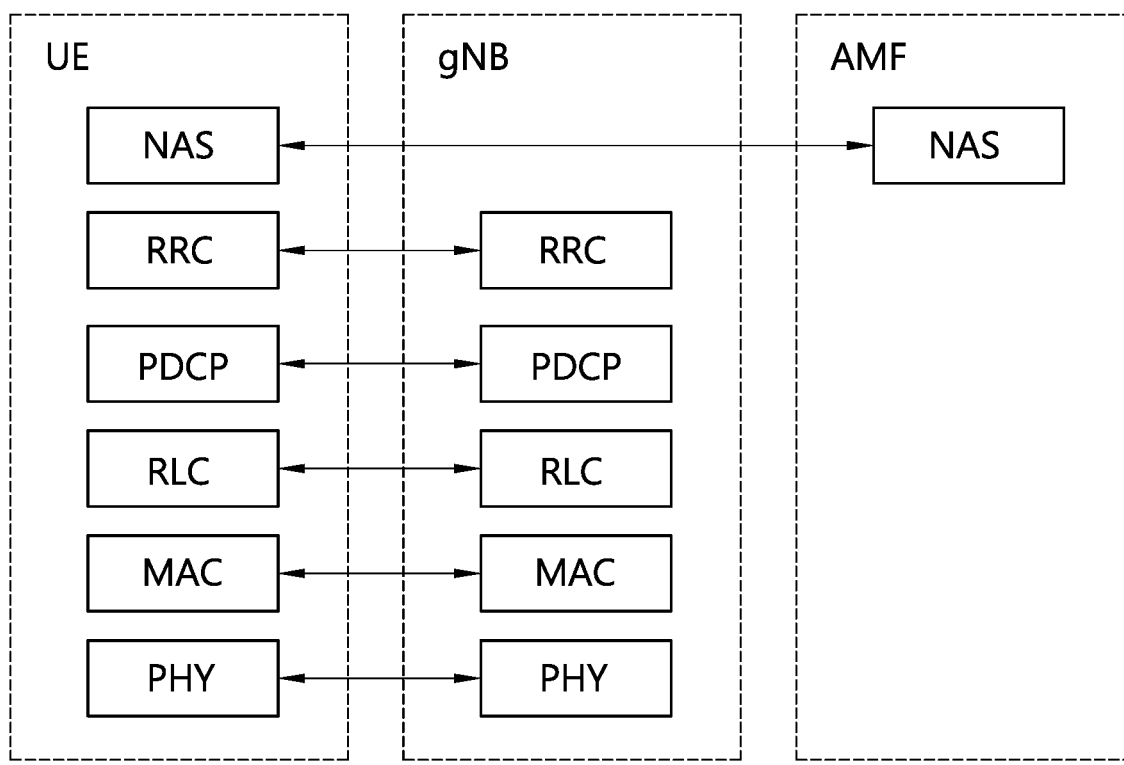
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell reselection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
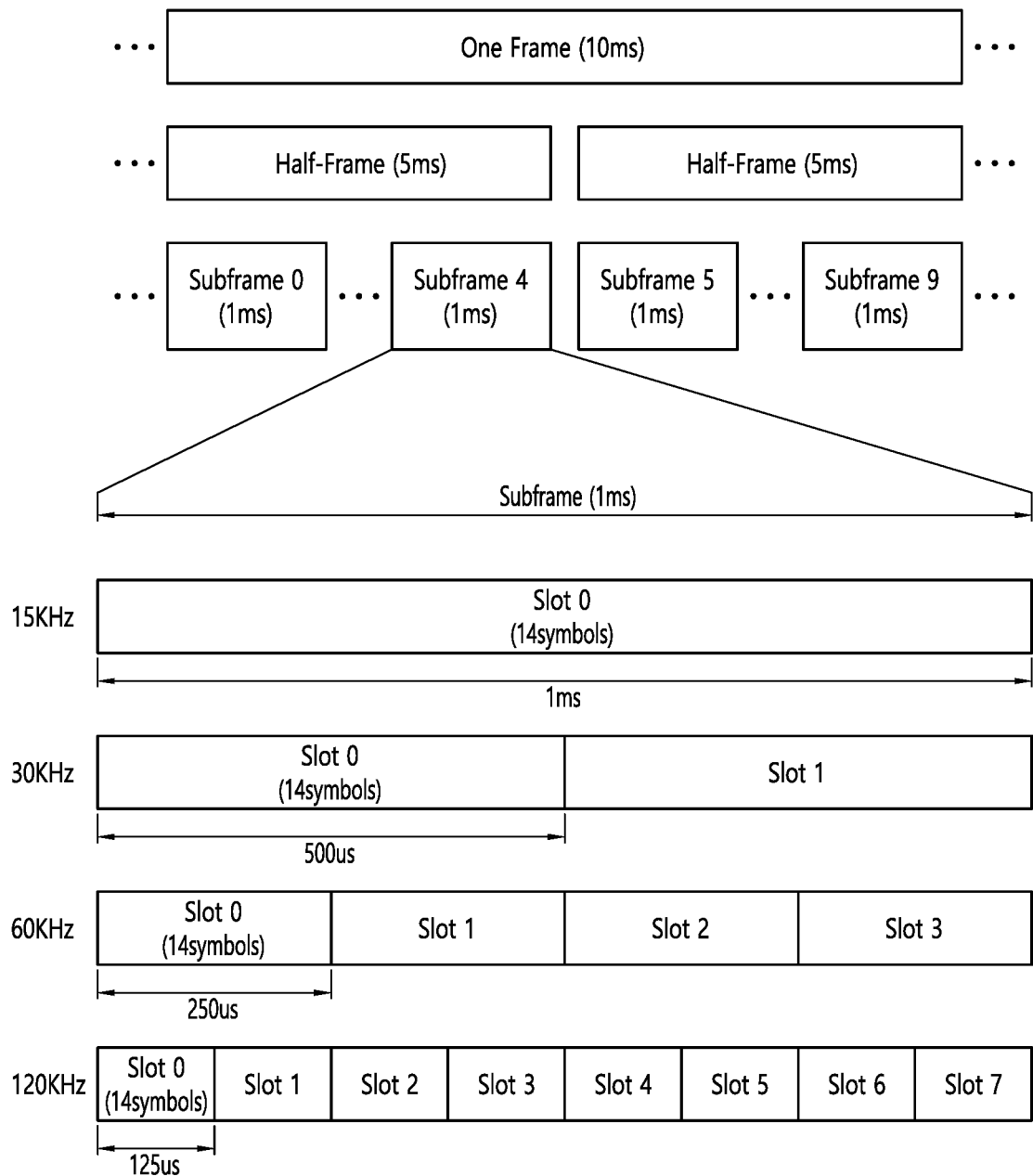
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2u*15$ kHz. The following table shows the number of OFDM symbols per slot, the number of slots per frame, and the number of slots per for the normal CP, according to the subcarrier spacing $\Delta f=2u*15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2u*15$ kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
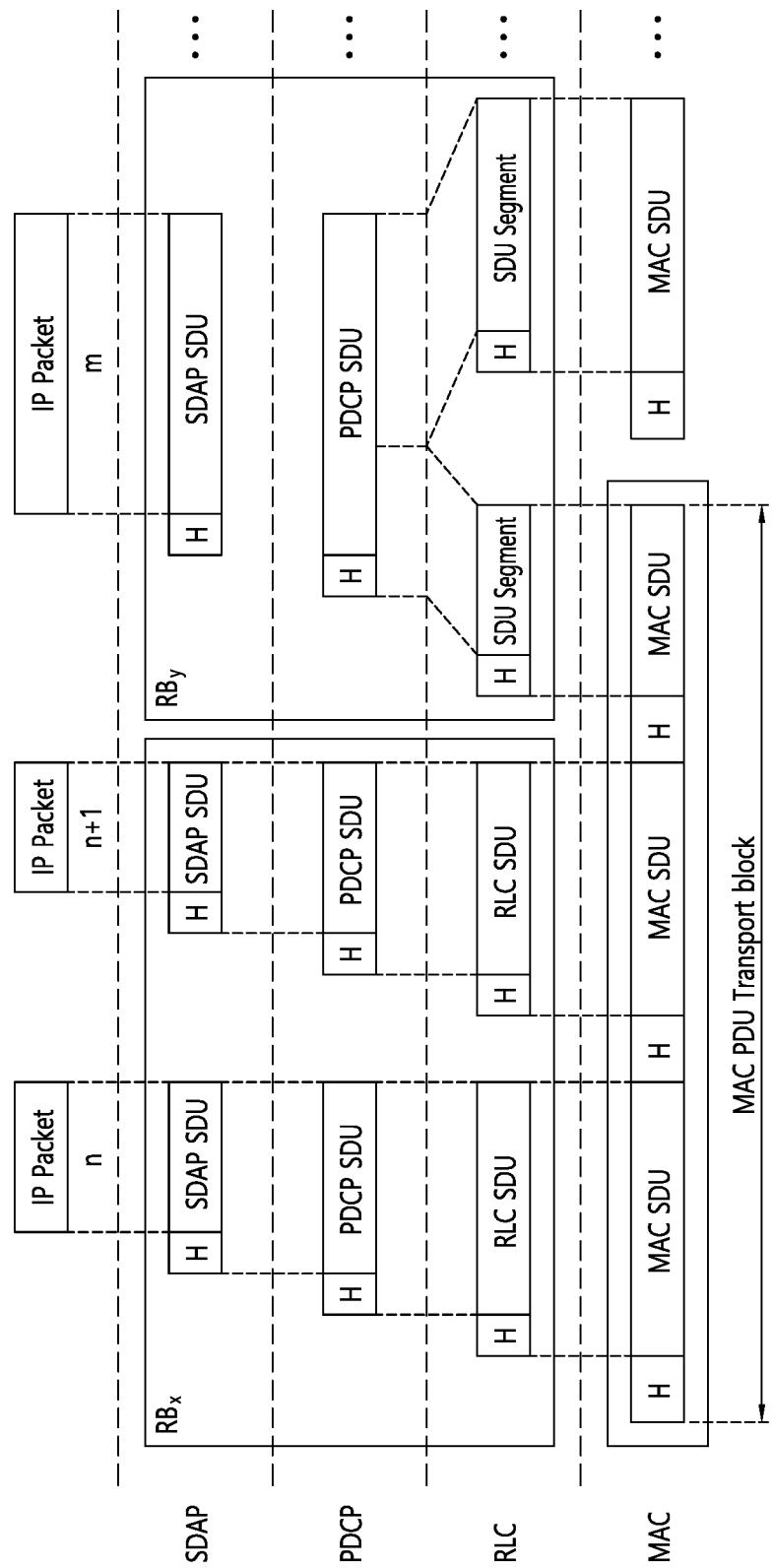
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
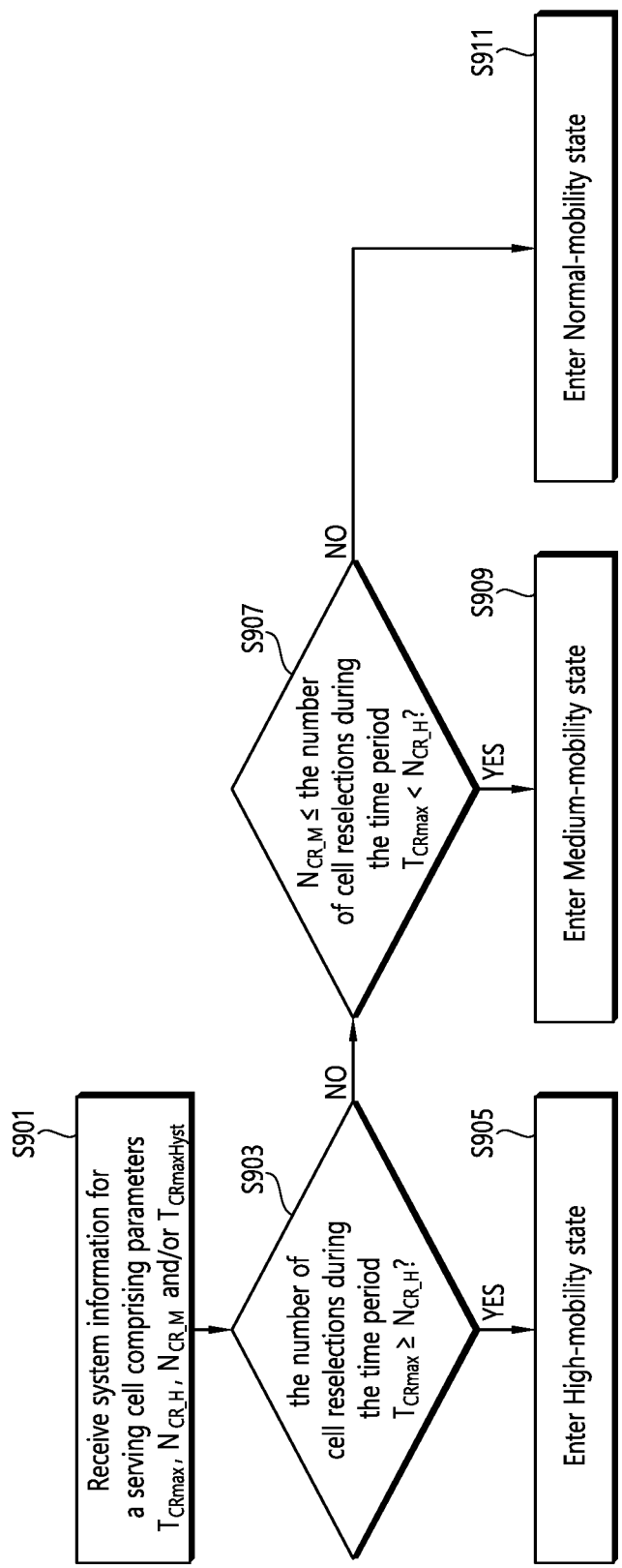
FIG. 9 shows an example of a method for mobility state estimation (MSE) to which technical features of the present disclosure can be applied.

FIG. 9 shows an example of a method for mobility state estimation (MSE) to which technical features of the present disclosure can be applied. Steps illustrated in FIG. 9 may be performed by a UE and/or a wireless device.

Referring to FIG. 9, in step S901, the UE may receive system information for a serving cell comprising parameters $T_{CRmax}$, $N_{CR\_H}$, $N_{CR\_M}$ and/or $T_{CRmaxHyst}$. The UE's mobility state may be determined if the parameters $T_{CRmax}$, $N_{CR\_H}$, $N_{CR\_M}$ and/or $T_{CRmaxHyst}$ are broadcasted in the system information for the serving cell. $T_{CRmax}$ may specify the duration for evaluating allowed amount of cell reselection(s). $N_{CR\_M}$ may specify the maximum number of cell reselections to enter Medium-mobility state. $N_{CR\_H}$ may specify the maximum number of cell reselections to enter High-mobility state. $T_{CRmaxHyst}$ may specify the additional time period before the UE can enter Normal-mobility state.

In step S903, the UE may determine whether the number of cell reselections during the time period $T_{CRmax}$ is greater than or equal to $N_{CR\_H}$. If the number of cell reselections during the time period $T_{CRmax}$ is greater than $N_{CR\_H}$, in step S905, the UE may detect the criteria for High-mobility state, and enter High-mobility state. Otherwise, the UE may perform step S907.

In step S907, the UE may determine whether the number of cell reselections during the time period $T\text{-}_{CRmax}$ is greater than or equal to $N_{CR\_M}$ but less than $N_{CR\_H}$. If the number of cell reselections during the time period $T\text{-}_{CRmax}$ is greater than or equal to $N_{CR\_H}$ but less than $N_{CR\_H}$, in step S909, the UE may detect the criteria for Medium-mobility state, and enter a Medium-mobility state. Otherwise, the UE may perform step S911.

In step S911, if the number of cell reselections during the time period $T_{CRmax}$ is less than $N\text{-}_{CR\_M}$, the UE may detect the criteria for a normal-mobility state. Further, if the criteria for either Medium-mobility state or High-mobility state is not detected during the time period $T_{CRmaxHyst}$, the UE may enter a Normal-mobility state.

Figure 10:
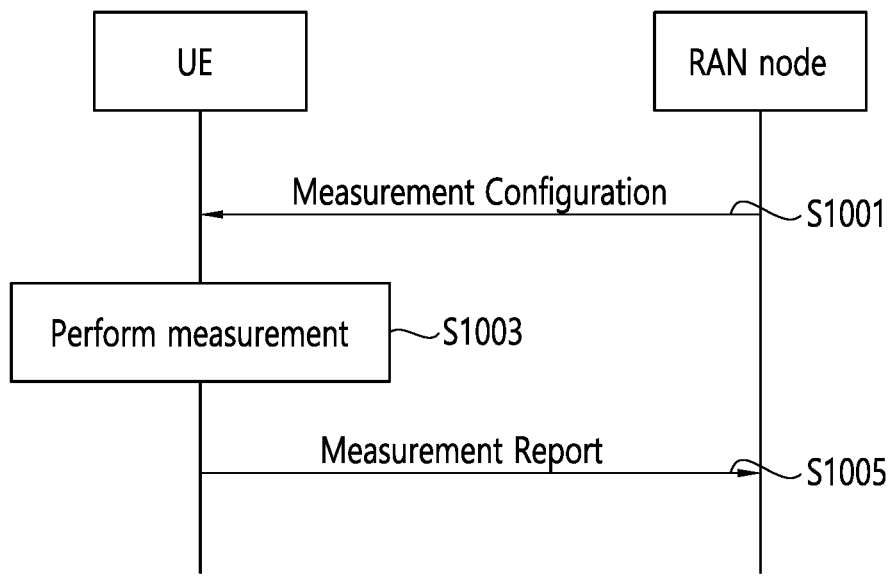
FIG. 10 shows an example of a method for a measurement and reporting to which technical features of the present disclosure can be applied.

FIG. 10 shows an example of a method for a measurement and reporting to which technical features of the present disclosure can be applied.

Referring to FIG. 10, in step S1001, a UE may receive a measurement configuration from a RAN node. The measurement configuration may comprise a measurement identifier (ID), which may be expressed as a combination of a measurement object and/or a report configuration. The measurement object may indicate object information regarding an object the UE is supposed to measure. For example, the object information may comprise a measurement frequency and/or a list of cells including serving cell/neighbor cell(s). The report configuration may comprise a report condition for the UE to transmit a measurement report.

In step S1003, the UE may perform a measurement based on the measurement configuration. For example, the UE may measure the serving cell and/or the neighbor cell(s) on the measurement frequency specified by the measurement configuration, to obtain a measurement result for the serving cell and/or the neighbor cell(s). The measurement result may comprise a cell quality/signal strength/signal quality/channel quality/channel state/reference signal received power (RSRP)/reference signal received quality (RSRQ) of the serving cell and/or the neighbor cell(s).

In step S1005, the UE may transmit a measurement report to the RAN node. The UE may transmit the measurement report comprising the measurement result for the serving cell and/or the neighbor cell(s) to the RAN node based on the report configuration (e.g., when the report condition is satisfied).

According to various embodiments, the measurement configuration may comprise/be related to at least one of a measurement period, a measurement gap, or a measurement gap repetition period. The measurement period refers to a time spacing between two consecutive moments at which a measurement on a neighbor cell is performed and/or a cell quality of the neighbor cell is obtained. The measurement gap refers to a gap/time period during which no transmission and reception happens for the UE to measure a neighbor cell/inter-frequency. The measurement gap repetition period refers to a time interval in which successive measurement gaps repetitively occurs. In other words, the measurement gap repetition period refers to a time interval between successive measurement gaps.

According to various embodiments, the measurement configuration may comprise a configuration parameter 's-MeasureConfig'. The s-MeasureConfig may be a threshold for NR SpCell RSRP measurement controlling when the UE is required to perform measurements on non-serving cells. If the s-MeasureConfig is set to ssb-RSRP, the threshold may be cell RSRP based on SS/PBCH block. If the s-MeasureConfig is set to csi-RSRP, the threshold may be cell RSRP of CSI-RS.

An RRC_CONNECTED UE shall derive cell measurement results by measuring one or multiple beams associated per cell as configured by the network. For all cell measurement results in RRC_CONNECTED, the UE may apply the layer 3 filtering before using the measured results for evaluation of reporting criteria and measurement reporting. For cell measurements, the network can configure RSRP, RSRQ or SINR as trigger quantity. Reporting quantities can be the same as trigger quantity or combinations of quantities (i.e. RSRP and RSRQ; RSRP and SINR; RSRQ and SINR; RSRP, RSRQ and SINR).

The network may also configure the UE to report measurement information per beam (which can either be measurement results per beam with respective beam identifier(s) or only beam identifier(s)). If beam measurement information is configured to be included in measurement reports, the UE may apply the layer 3 beam filtering. On the other hand, the exact layer 1 filtering of beam measurements used to derive cell measurement results may be implementation dependent.

With regard to the s-MeasureConfig, the UE shall:
1> if s-MeasureConfig is not configured, or
1> if s-MeasureConfig is set to ssb-RSRP and the NR SpCell RSRP based on SS/PBCH block, after layer 3 filtering, is lower than ssb-RSRP, or
1> if s-MeasureConfig is set to csi-RSRP and the NR SpCell RSRP based on CSI-RS, after layer 3 filtering, is lower than csi-RSRP:
2> if the measObject is associated to NR and the rsType is set to csi-rs:
3> if reportQuantityRS-Indexes and maxNrofRS-IndexesToReport for the associated reportConfig (i.e., report configuration) are configured:
4> derive layer 3 filtered beam measurements only based on CSI-RS for each measurement quantity indicated in reportQuantityRS-Indexes;
3> derive cell measurement results based on CSI-RS for each trigger quantity and each measurement quantity indicated in reportQuantityCell using parameters from the associated measObject (i.e., measurement object);
2> if the measObject is associated to NR and the rsType is set to ssb:
3> if reportQuantityRS-Indexes and maxNrofRS-IndexesToReport for the associated reportConfig are configured:
4> derive layer 3 beam measurements only based on SS/PBCH block for each measurement quantity indicated in reportQuantityRS-Indexes;
3> derive cell measurement results based on SS/PBCH block for each trigger quantity and each measurement quantity indicated in reportQuantityCell using parameters from the associated measObject;
2> if the measObject is associated to E-UTRA:
3> perform the corresponding measurements associated to neighbouring cells on the frequencies indicated in the concerned measObject.

When a UE is in RRC_CONNECTED, if a threshold s-MeasureConfig is configured and if the SpCell RSRP based on SS/PBCH block or CSI-RS is lower than the configured threshold (i.e., the configured s-MeasureConfig), the UE may perform configured cell measurements. If not (i.e., if the SpCell quality is higher than the configured threshold), the UE does not need to perform the cell measurements in order to reduce power consumption, because SpCell being in a good quality means that UE mobility may not occur soon.

However, the s-MeasureConfig may either i) allow the UE to perform the cell measurements, or ii) not allow the UE to perform the cell measurements (i.e., turning on/off the cell measurements). Suppose a UE is near edge of the PCell coverage so that the UE may perform all the cell measurements. If the UE moves toward the serving PCell, the PCell quality may increase. However, until the PCell quality reaches the configured threshold, the UE may still perform all the cell measurements. After the PCell quality becomes higher than the configured threshold, then the UE does not perform cell measurements, except SpCell.

Rather than a current mechanism in which only a single measurement configuration is provided and a possible UE operation is only performing or not performing the measurement according to the SpCell quality, it seems to be beneficial for the UE to be provided with a multiple set of measurement configurations so that the UE can flexibly select one of the measurement configurations based on the UE specific condition.

For example, a serving cell RSRP measured by a UE can be an example of the UE specific condition.

For another example, a mobility state of the UE can be another example of the UE specific condition. However, the MSE mechanism used in idle/inactive mode may be based on the number of recent cell reselections, so the UE's mobility state in a certain cell (e.g., a single cell) may not be estimated. Therefore, even if a UE is moving fast in a single cell, the UE may still consider itself as being stationary, according to the MSE mechanism.

According to various embodiments of the present disclosure, a UE may calculate a variation of serving cell RSRP values. Based on the serving cell RSRP variation, the UE may vary the measurement performance.

Figure 11:
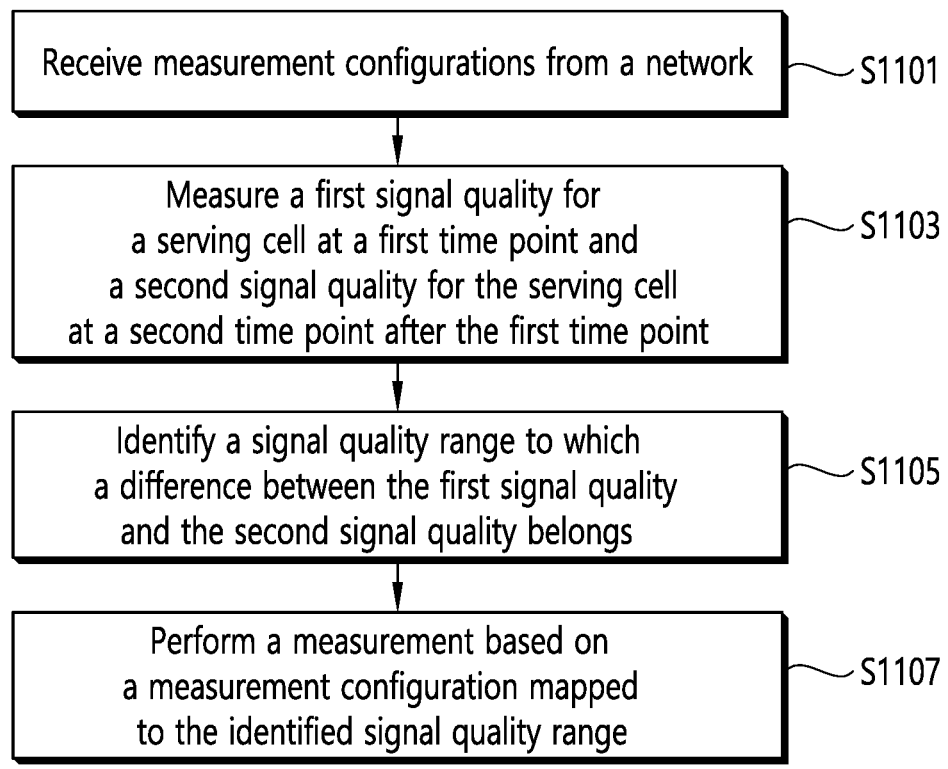
FIG. 11 shows an example of a method for performing a measurement according to an embodiment of the present disclosure.

FIG. 11 shows an example of a method for performing a measurement according to an embodiment of the present disclosure. Steps illustrated in FIG. 11 may be performed by a UE and/or a wireless device.

Referring to FIG. 11, in step S1101, a wireless device may receive measurement configurations from a network. Each of the measurement configurations may be mapped to/comprise a corresponding signal quality range. The signal quality range may comprise an RSRP value range.

In step S1103, the wireless device may measure a first signal quality for a serving cell at a first time point and a second signal quality for the serving cell at a second time point after the first time point. The second time point may be determined by considering the first time point, which will be described later.

In step S1105, the wireless device may identify a signal quality range to which a difference between the first signal quality and the second signal quality belongs. The difference may comprise an absolute value (that is, non-negative integer), or a value that is obtained by subtracting the first signal quality from the second signal quality (that is, a value of (second signal quality–first signal quality), which may be positive/0/negative integer).

In step S1107, the wireless device may perform a measurement based on a measurement configuration mapped to the identified signal quality range. That is, the wireless device may apply the measurement configuration mapped to the identified signal quality range to perform a measurement on the serving cell/neighbor cell(s).

According to various embodiments, the second time point may be a time point at which a signal quality for the serving cell is to be measured right after the first signal quality is measured.

According to various embodiments, the second time point may be a time point after a first time duration starting from the first time point has passed. The first time duration may be a minimum allowed time interval between the first time point and a time point at which a signal quality for the serving cell is to be measured after the first signal quality is measured. The first time duration may be provided by the network. That is, the wireless device may receive a configuration for the first time duration via higher layer signalling, or receive information for the first time duration via downlink control information (DCI)/MAC control element (MAC CE). The configuration/information for the first time duration may be provided from the network to the wireless device by a broadcast signalling and/or a dedicated signalling.

According to various embodiments, the second time point may be within a second time duration starting from the first time point. The second time duration may be provided by the network. That is, the wireless device may receive a configuration for the second time duration via higher layer signalling, or receive information for the second time duration via downlink control information (DCI)/MAC control element (MAC CE). The configuration/information for the second time duration may be provided from the network to the wireless device by a broadcast signalling and/or a dedicated signalling.

According to various embodiments, the second time duration may be a maximum allowed time interval between the first time point and a time point at which a signal quality for the serving cell is to be measured after the first signal quality is measured.

According to the various embodiments, both of the configuration/information for the first time duration and the configuration/information for the first time duration may be provided from the network to the wireless device. The configuration/information for the first time duration may be included in the measurement configuration. The configuration/information for the second time duration may be included in the measurement configuration.

According to the various embodiments, the second time point may be a time interval away from the first time point. The time interval may be provided by the network. That is, the wireless device may receive a configuration for the time interval via higher layer signalling, or receive information for the time interval via downlink control information (DCI)/MAC control element (MAC CE). The configuration/information for the time interval may be provided from the network to the wireless device by a broadcast signalling and/or a dedicated signalling. The time interval may be included in the measurement configuration.

According to the various embodiments, the wireless device may receive, from the network, information for a mapping relationship between each of the measurement configurations and the corresponding signal quality range. The wireless device may identify the measurement configuration mapped to the signal quality range to which the difference between the first signal quality and the second signal quality belongs based on the mapping information.

According to the various embodiments, the wireless device may receive, from the network, information for signal quality ranges, wherein each of the signal quality ranges is mapped to each of the measurement configurations. The wireless device may identify the difference between the first signal quality and the second signal quality. The wireless device may identify the signal quality range to which the identified difference belongs among the signal quality ranges.

According to the various embodiments, the measurement configurations may comprise a first measurement configuration mapped to a first signal quality range, and a second measurement configuration mapped to a second signal quality range higher than the first signal quality range. Further, i) a measurement period related to the second measurement configuration may be longer than that related to the first measurement configuration; ii) a measurement gap related to the second measurement configuration may be shorter than that related to the first measurement configuration; or iii) a measurement gap repetition period related to the second measurement configuration may be longer than that related to the first measurement configuration.

According to the various embodiments, the wireless device may move from an edge of the serving cell to a center of the serving cell.

According to the various embodiments, the wireless device may move from a center of the serving cell to an edge of the serving cell. The measurement configurations may comprise a first measurement configuration mapped to a first signal quality range, and a second measurement configuration mapped to a second signal quality range higher than the first signal quality range. Further, i) a measurement period related to the second measurement configuration may be shorter than that related to the first measurement configuration; ii) a measurement gap related to the second measurement configuration may be longer than that related to the first measurement configuration; or iii) a measurement gap repetition period related to the second measurement configuration may be shorter than that related to the first measurement configuration.

According to the various embodiments, signal quality range A may be considered higher than signal quality range B if i) lower bound of the signal quality range A is higher than upper bound of the signal quality range B, or ii) medium/average value of the signal quality range A is higher than that of the signal quality range B. Similarly, signal quality range A may be considered lower than signal quality range B if i) an upper bound of the signal quality range A is lower than a lower bound of the signal quality range B, or ii) medium/average value of the signal quality range A is lower than that of the signal quality range B.

Figure 12:
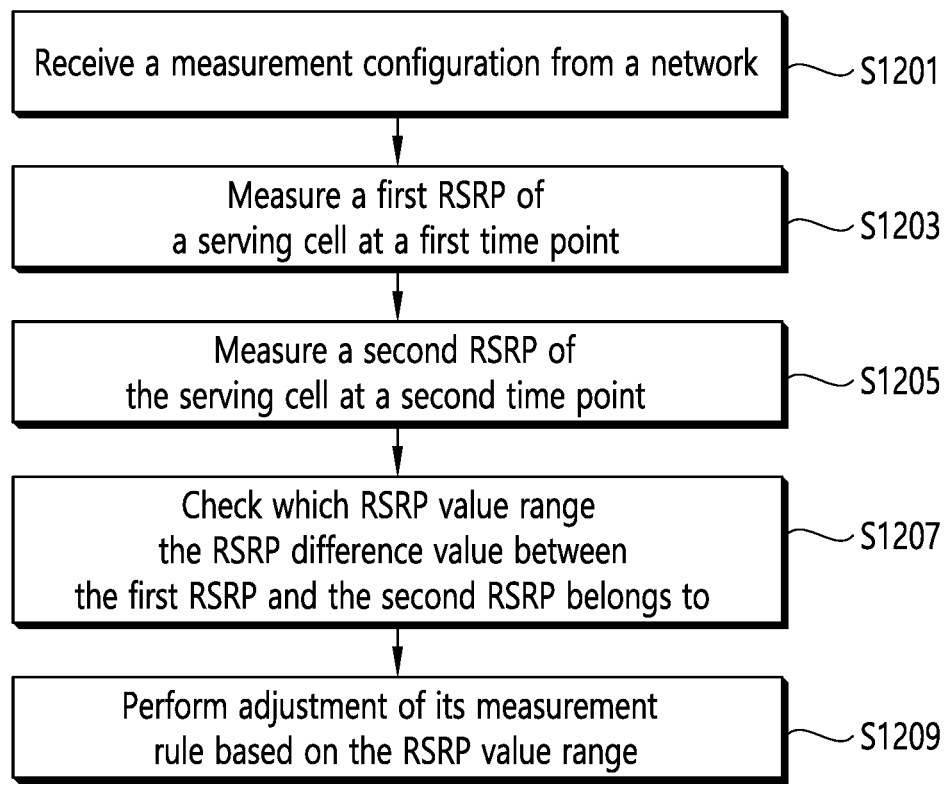
FIG. 12 shows an example of a method for performing a measurement based on a variation of a serving cell quality according to an embodiment of the present disclosure.

FIG. 12 shows an example of a method for performing a measurement based on a variation of a serving cell quality according to an embodiment of the present disclosure. Steps illustrated in FIG. 12 may be performed by a UE and/or a wireless device.

Referring to FIG. 12, in step S1201, the UE may receive a measurement configuration from a network. That is, the network may provide the measurement configuration to the UE. The UE may determine its measurement rule according to the provided measurement configuration. The provided measurement configuration may include multiple measurement configurations. Each measurement configuration may be mapped to an RSRP value range. Different measurement configurations may not be mapped to a single (or, the same) RSRP value range. Parameters included in the measurement configuration may have multiple values. Each parameter value may be mapped to an RSRP value range. Different parameter values may not be mapped to a single (or, the same) RSRP value range.

In step S1203, the UE may measure a first RSRP of a serving cell at a first time point.

In step S1205, the UE may measure a second RSRP of the serving cell at a second time point after the first time point.

For example, the second RSRP may be the right next measurement result to the first RSRP.

For another example, the second RSRP may be measured within a time duration starting from the first time point at which the first RSRP was measured. The time duration may be provided/configured by the network, via broadcast or dedicated signalling.

For another example, the second RSRP may be a measurement result which is measured after a first time duration starting from the time point at which the first RSRP was measured. The first time duration may correspond to a minimum time duration threshold, which should pass after measuring the first RSRP, for measuring the second RSRP. The first time duration may be provided to guarantee a reliability of the second RSRP. For example, if the first time duration is configured as 3 sec, the second RSRP may be measured after 3 sec from the time point at which the first RSRP was measured. The first time duration may be provided/configured by the network, via broadcast or dedicated signalling.

For another example, the second RSRP may be a measurement result which is measured within a second time duration starting from the time point at which the first RSRP was measured. The second time duration may correspond to a maximum time duration threshold within which the second RSRP may be measured. For example, if the second time duration is configured as 5 sec, the second RSRP may be measured within 5 sec from the time point at which the first RSRP was measured. The second time duration may be provided/configured by the network, via broadcast or dedicated signalling.

In step S1207, the UE may calculate the RSRP difference value between the first RSRP and second RSRP, and check which RSRP value range the RSRP difference value belongs to. The RSRP value range may be defined by two threshold values. One threshold may be an upper bound threshold of the RSRP value range and the other one may be a lower bound threshold of the RSRP value range. The thresholds may be positive, zero, or negative. The RSRP value range may be provided/configured by the network, via broadcast or dedicated signalling.

In step S1209, based on the RSRP value range checked in step S1207, the UE may performs adjustment of its measurement rule. For example, the adjustment of the measurement rule may include selecting a measurement configuration mapped to the RSRP value range. For another example, the adjustment of the measurement rule may include selecting the parameter value mapped to the RSRP value range. As a result of the measurement rule adjustment, configuration(s) of at least one of measurement period, measurement gap, measurement report, the number of measurement targets, the number of measurement objects, measurement accuracy requirement, or cell detection requirement may be varied. The standard specification '3GPP TS 38.133 V15.4.0 may be referred to define the cell detection requirement and the measurement accuracy requirement.

According to a various embodiments, when the UE moves from a cell edge to a cell center, the greater the RSRP value range is, the faster the UE moves from the cell edge to the cell center. In this case, the measurement rule may be relaxed. That is, the measurement rule may be adjusted to have longer measurement period, shorter measurement gap length, longer measurement gap repetition period, relaxed cell detection requirement, and/or lower measurement accuracy requirement.

According to various embodiments, when 'the UE moves from a cell center to a cell edge, the greater the RSRP value range is, the faster the UE moves from the cell center to the cell edge. In this case, the measurement rule may be tightened. That is, the measurement rule may be adjusted to have shorter measurement period, longer measurement gap length, shorter measurement gap repetition period, tightened cell detection requirement, and/or higher measurement accuracy requirement.

A UE may calculate a variation of RSRP values for a serving cell. The UE may adjust its measurement rule according to the information (e.g., multiple measurement configurations each of which is related to a corresponding RSRP value range) provided by the network, based on the variation of RSRP values for the serving cell.

According to various embodiments, before performing the step S1201, the UE may establish a connection with a network (e.g. gNB). The UE may perform initial access towards the cell. The UE and the cell may perform RACH procedure. The UE may establish or resume a connection with the gNB and enter RRC_CONNECTED. The UE may perform AS security activation upon receiving Security Mode Command from the gNB. The UE may configure radio bearers and radio configuration upon receiving RRC reconfiguration or resume radio bearers and radio configuration upon receiving RRC resume.

According to various embodiments, after performing the step S1209, when the UE moves far away from cell center and moves to cell edge, the UE may perform mobility procedure. The UE may perform handover to a target cell.

Figure 13:
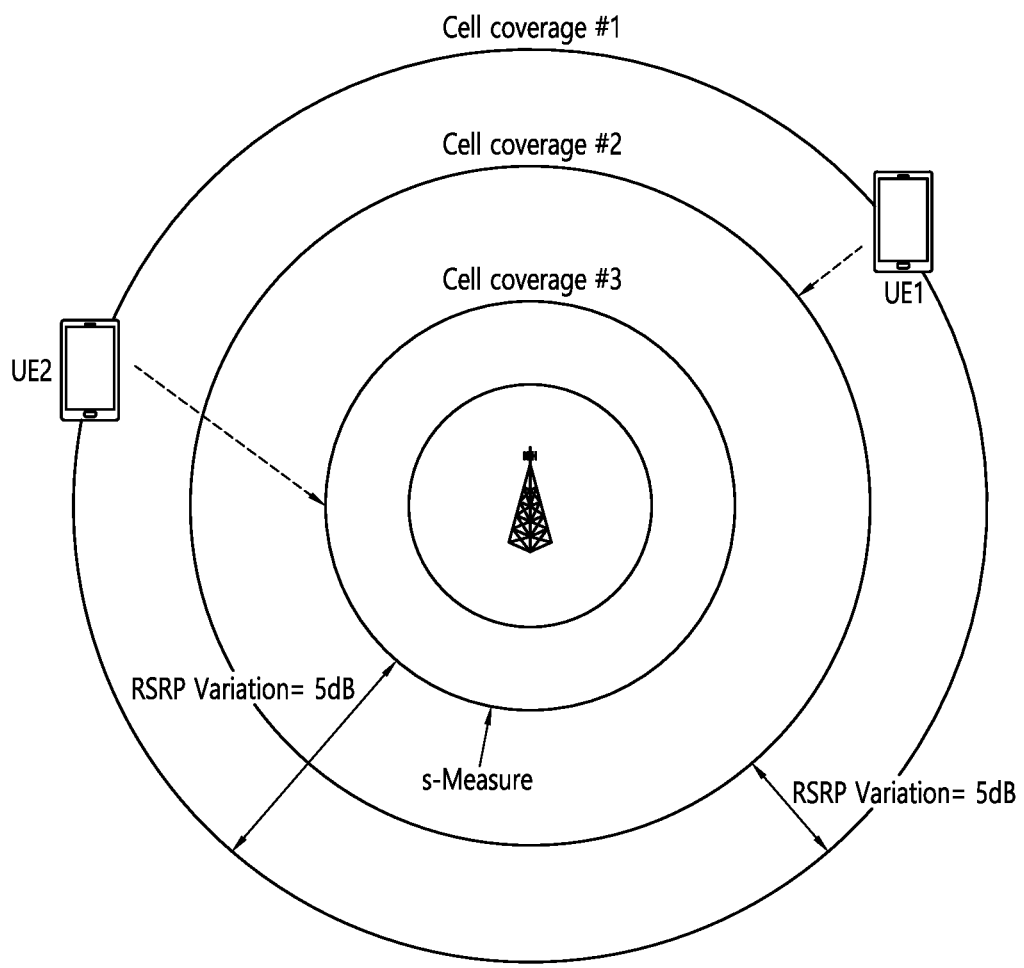
FIG. 13 shows an example of a measurement rule adjustment in a case the UEs are moving towards the cell center according to an embodiment of the present disclosure.

FIG. 13 shows an example of a measurement rule adjustment in a case the UEs are moving towards the cell center according to an embodiment of the present disclosure.

Referring to FIG. 13, two UEs are moving toward the cell from the edge of cell coverage (from Cell coverage #1 to center of cell coverage). Therefore, a serving cell quality measured by the UEs may increase. After 5 seconds, the UE1 may arrive at cell coverage #2 while the UE2 may arrive at cell coverage #3. At this time point, the serving cell RSRP variation between cell coverage #1 and cell coverage #2 measured by the UE1 may be 5 dB, while the serving cell RSRP variation between cell coverage #1 and cell coverage #3 measured by the UE2 may be 10 dB. If the same measurement rule is applied to the UE1 and the UE2, both UE1 and UE 2 shall perform the same measurement, as their serving cell quality is still below s-MeasureConfig value.

However, according to various embodiments, based on the serving cell RSRP variation of UE1 and UE2, each UE can differently adjust their measurement rule. As UE2's serving cell RSRP was increased greater than UE 1's serving cell RSRP, which means that UE2 is getting closer to the serving cell quicker than UE1, so UE2 can more relax the measurement than UE1.

Relaxing the measurement may include/be associated with a longer measurement period, a shorter measurement gap length, a longer measurement gap repetition period, a relaxed cell detection requirement, and/or a lower measurement accuracy requirement.

Figure 14:
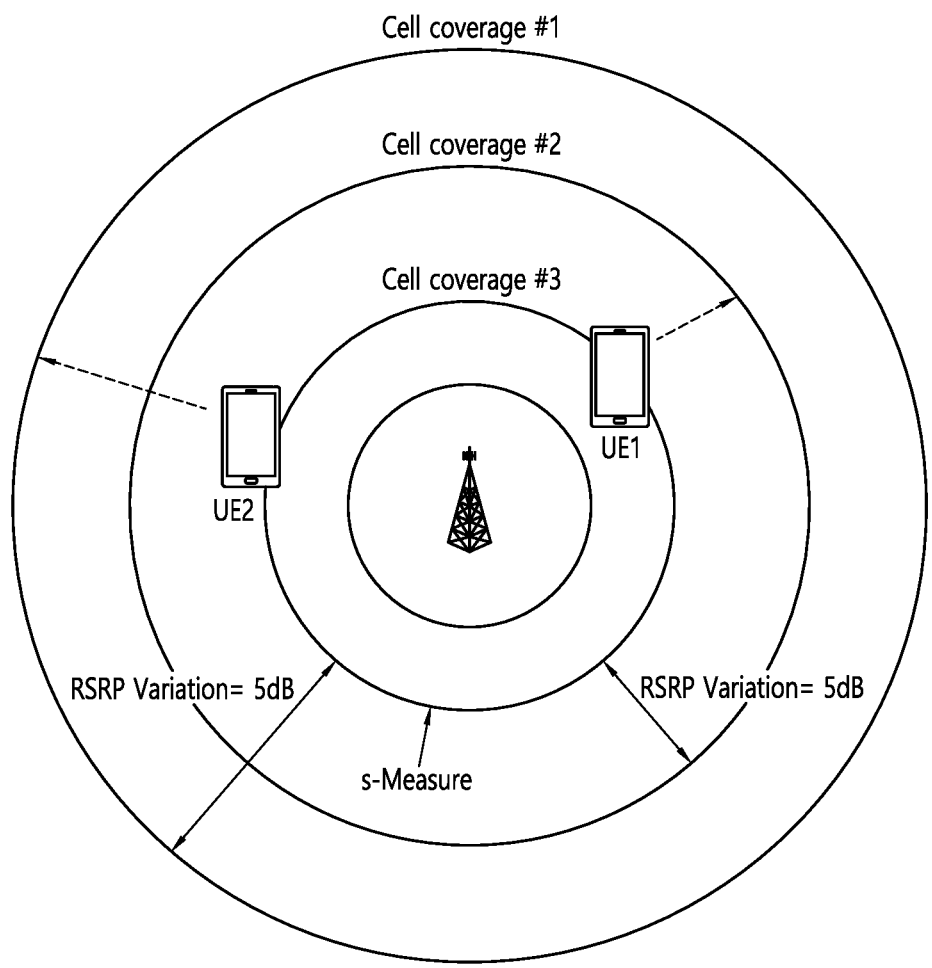
FIG. 14 shows an example of a measurement rule adjustment in a case the UEs are moving towards the cell edge according to an embodiment of the present disclosure.

FIG. 14 shows an example of a measurement rule adjustment in a case the UEs are moving towards the cell edge according to an embodiment of the present disclosure.

Referring to FIG. 14, UE1 and UE2 were at cell coverage #3, and after few seconds, UE1 may arrive at cell coverage #2 while the UE2 may arrive at cell coverage #1, at same time point. A serving cell RSRP measured by the UE2 may decrease (i.e. by 10 dB) greater than that measured by the UE1 (i.e. by 5 dB). It means that the UE2 is moving away from the cell quicker than the UE1. So the UE2 may need to quickly intensify (or, tighten) the measurement rule than the UE1 to prepare the mobility. If the same measurement rule is applied to the UE1 and the UE2, both the UE1 and the UE2 may perform the same measurement when the UE1 and the UE2 were provided with the same measurement configuration.

However, according to the various embodiments, based on the measured serving cell RSRP variation, the UE2 can adjust the measurement rule more intensively (or, tightly) than the UE 1.

More intensive measurement may include/be associated with a shorter measurement period, a longer measurement gap length, a shorter measurement gap repetition period, a tightened cell detection requirement, and/or a higher measurement accuracy requirement.

Figure 15:
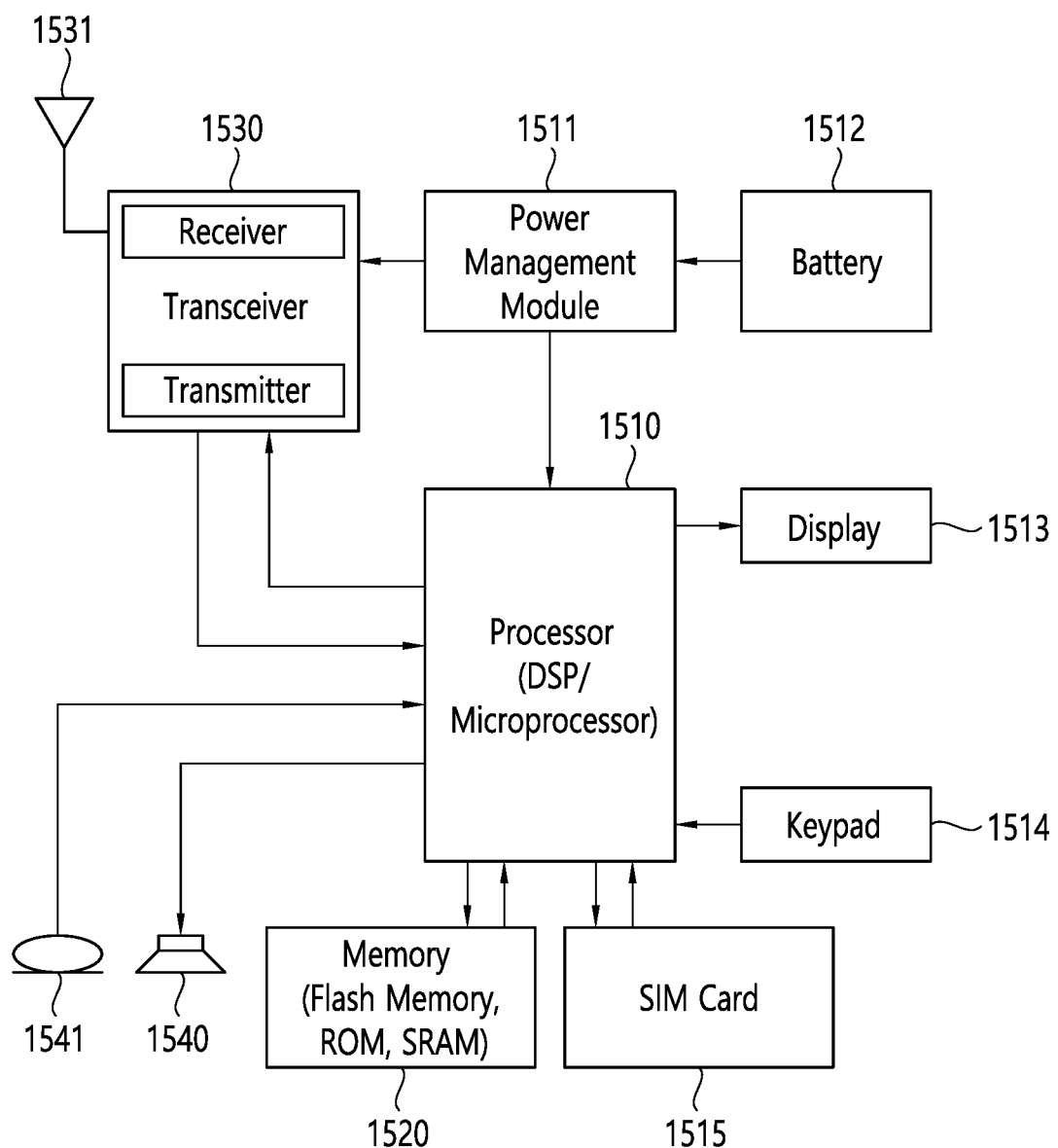
FIG. 15 shows a UE to implement an embodiment of the present disclosure.

FIG. 15 shows a UE to implement an embodiment of the present disclosure. The present disclosure described above for UE side may be applied to this embodiment.

A UE includes a processor 1510, a power management module 1511, a battery 1512, a display 1513, a keypad 1514, a subscriber identification module (SIM) card 1510, a memory 1520, a transceiver 1530, one or more antennas 1531, a speaker 1540, and a microphone 1541.

The processor 1510 may be configured to implement proposed functions, procedures and/or methods described in this description. Layers of the radio interface protocol may be implemented in the processor 1510. The processor 1510 may include application-specific integrated circuit (ASIC), other chipset, logic circuit and/or data processing device. The processor 1510 may be an application processor (AP). The processor 1510 may include at least one of a digital signal processor (DSP), a central processing unit (CPU), a graphics processing unit (GPU), a modem (modulator and demodulator). An example of the processor 1510 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1510 may be configured to, or configured to control the transceiver 1530 to implement steps performed by the UE and/or the wireless device throughout the disclosure.

The power management module 1511 manages power for the processor 1510 and/or the transceiver 1530. The battery 1512 supplies power to the power management module 1511. The display 1513 outputs results processed by the processor 1510. The keypad 1514 receives inputs to be used by the processor 1510. The keypad 1514 may be shown on the display 1513. The SIM card 1510 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1520 is operatively coupled with the processor 1510 and stores a variety of information to operate the processor 1510. The memory 1520 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1520 and executed by the processor 1510. The memory 1520 can be implemented within the processor 1510 or external to the processor 1510 in which case those can be communicatively coupled to the processor 1510 via various means as is known in the art.

The transceiver 1530 is operatively coupled with the processor 1510, and transmits and/or receives a radio signal. The transceiver 1530 includes a transmitter and a receiver. The transceiver 1530 may include baseband circuitry to process radio frequency signals. The transceiver 1530 controls the one or more antennas 1531 to transmit and/or receive a radio signal.

The speaker 1540 outputs sound-related results processed by the processor 1510. The microphone 1541 receives sound-related inputs to be used by the processor 1510.

Figure 18:
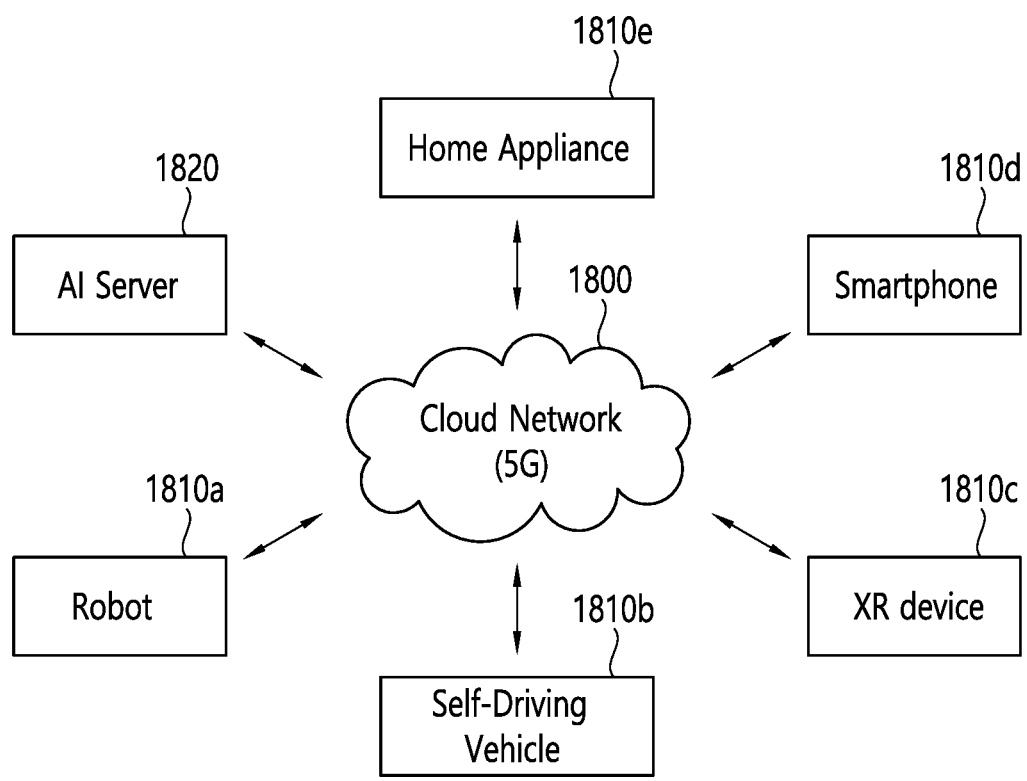
FIG. 18 shows an example of an AI system to which the technical features of the present disclosure can be applied.

FIG. 18 shows another example of a wireless communication system to which the technical features of the present disclosure can be applied.

Referring to FIG. 18, the wireless communication system may include a first device 1810 (i.e., first device 210) and a second device 1820 (i.e., second device 220).

The first device 1810 may include at least one transceiver, such as a transceiver 1811, and at least one processing chip, such as a processing chip 1812. The processing chip 1812 may include at least one processor, such a processor 1813, and at least one memory, such as a memory 1814. The memory may be operably connectable to the processor 1813. The memory 1814 may store various types of information and/or instructions. The memory 1814 may store a software code 1815 which implements instructions that, when executed by the processor 1813, perform operations of the first device 910 described throughout the disclosure. For example, the software code 1815 may implement instructions that, when executed by the processor 1813, perform the functions, procedures, and/or methods of the first device 1810 described throughout the disclosure. For example, the software code 1815 may control the processor 1813 to perform one or more protocols. For example, the software code 1815 may control the processor 1813 to perform one or more layers of the radio interface protocol.

The second device 1820 may include at least one transceiver, such as a transceiver 1821, and at least one processing chip, such as a processing chip 1822. The processing chip 1822 may include at least one processor, such a processor 1823, and at least one memory, such as a memory 1824. The memory may be operably connectable to the processor 1823. The memory 1824 may store various types of information and/or instructions. The memory 1824 may store a software code 1825 which implements instructions that, when executed by the processor 1823, perform operations of the second device 1820 described throughout the disclosure. For example, the software code 1825 may implement instructions that, when executed by the processor 1823, perform the functions, procedures, and/or methods of the second device 1820 described throughout the disclosure. For example, the software code 1825 may control the processor 1823 to perform one or more protocols. For example, the software code 1825 may control the processor 1823 to perform one or more layers of the radio interface protocol.

Figure 16:
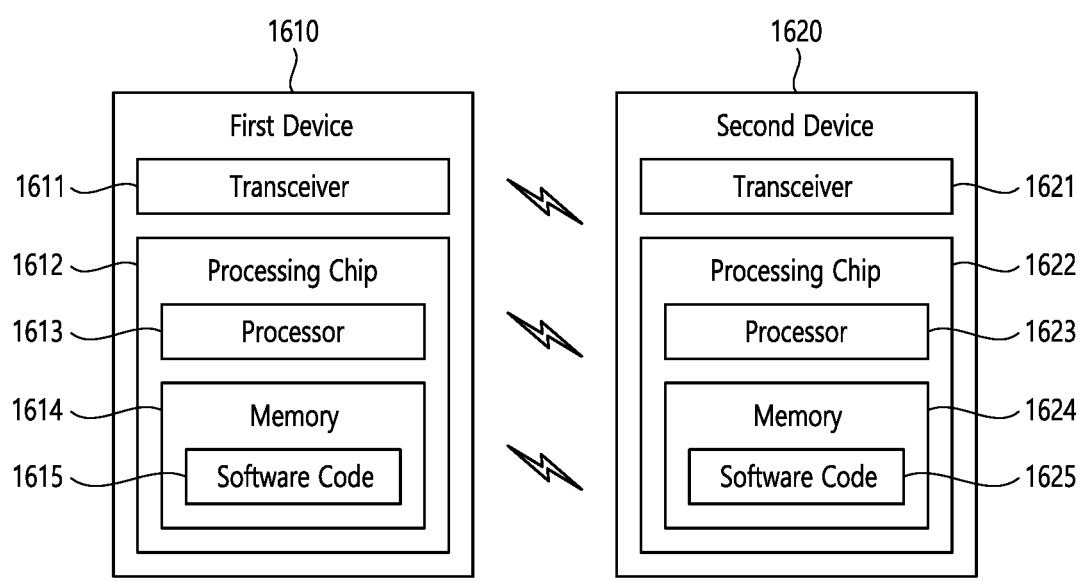
FIG. 16 shows another example of a wireless communication system to which the technical features of the present disclosure can be applied.

FIG. 16 shows another example of a wireless communication system to which the technical features of the present disclosure can be applied.

Referring to FIG. 16, the wireless communication system may include a first device 1610 (i.e., first device 210) and a second device 1620 (i.e., second device 220).

The first device 1610 may include at least one transceiver, such as a transceiver 1611, and at least one processing chip, such as a processing chip 1612. The processing chip 1612 may include at least one processor, such a processor 1613, and at least one memory, such as a memory 1614. The memory may be operably connectable to the processor 1613. The memory 1614 may store various types of information and/or instructions. The memory 1614 may store a software code 1615 which implements instructions that, when executed by the processor 1613, perform operations of the first device 910 described throughout the disclosure. For example, the software code 1615 may implement instructions that, when executed by the processor 1613, perform the functions, procedures, and/or methods of the first device 1610 described throughout the disclosure. For example, the software code 1615 may control the processor 1613 to perform one or more protocols. For example, the software code 1615 may control the processor 1613 to perform one or more layers of the radio interface protocol.

The second device 1620 may include at least one transceiver, such as a transceiver 1621, and at least one processing chip, such as a processing chip 1622. The processing chip 1622 may include at least one processor, such a processor 1623, and at least one memory, such as a memory 1624. The memory may be operably connectable to the processor 1623. The memory 1624 may store various types of information and/or instructions. The memory 1624 may store a software code 1625 which implements instructions that, when executed by the processor 1623, perform operations of the second device 1620 described throughout the disclosure. For example, the software code 1625 may implement instructions that, when executed by the processor 1623, perform the functions, procedures, and/or methods of the second device 1620 described throughout the disclosure. For example, the software code 1625 may control the processor 1623 to perform one or more protocols. For example, the software code 1625 may control the processor 1623 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 17:
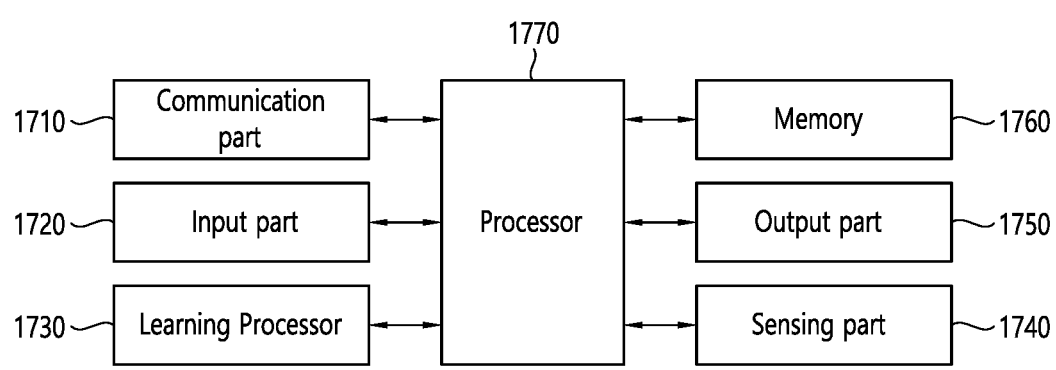
FIG. 17 shows an example of an AI device to which the technical features of the present disclosure can be applied.

FIG. 17 shows an example of an AI device to which the technical features of the present disclosure can be applied.

The AI device 1700 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 17, the AI device 1700 may include a communication part 1710, an input part 1720, a learning processor 1730, a sensing part 1740, an output part 1750, a memory 1760, and a processor 1770.

The communication part 1710 can transmit and/or receive data to and/or from external devices such as the AI devices and the AI server using wire and/or wireless communication technology. For example, the communication part 1710 can transmit and/or receive sensor information, a user input, a learning model, and a control signal with external devices. The communication technology used by the communication part 1710 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1720 can acquire various kinds of data. The input part 1720 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1720 can acquire input data to be used when acquiring an output using learning data and a learning model for model learning. The input part 1720 may obtain raw input data, in which case the processor 1770 or the learning processor 1730 may extract input features by preprocessing the input data.

The learning processor 1730 may learn a model composed of an ANN using learning data. The learned ANN can be referred to as a learning model. The learning model can be used to infer result values for new input data rather than learning data, and the inferred values can be used as a basis for determining which actions to perform. The learning processor 1730 may perform AI processing together with the learning processor of the AI server. The learning processor 1730 may include a memory integrated and/or implemented in the AI device 1700. Alternatively, the learning processor 1730 may be implemented using the memory 1760, an external memory directly coupled to the AI device 1700, and/or a memory maintained in an external device.

The sensing part 1740 may acquire at least one of internal information of the AI device 1700, environment information of the AI device 1700, and/or the user information using various sensors. The sensors included in the sensing part 1740 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1750 may generate an output related to visual, auditory, tactile, etc. The output part 1750 may include a display unit for outputting visual information, a speaker for outputting auditory information, and/or a haptic module for outputting tactile information.

The memory 1760 may store data that supports various functions of the AI device 1700. For example, the memory 1760 may store input data acquired by the input part 1720, learning data, a learning model, a learning history, etc.

The processor 1770 may determine at least one executable operation of the AI device 1700 based on information determined and/or generated using a data analysis algorithm and/or a machine learning algorithm. The processor 1770 may then control the components of the AI device 1700 to perform the determined operation. The processor 1770 may request, retrieve, receive, and/or utilize data in the learning processor 1730 and/or the memory 1760, and may control the components of the AI device 1700 to execute the predicted operation and/or the operation determined to be desirable among the at least one executable operation. The processor 1770 may generate a control signal for controlling the external device, and may transmit the generated control signal to the external device, when the external device needs to be linked to perform the determined operation. The processor 1770 may obtain the intention information for the user input and determine the user's requirements based on the obtained intention information. The processor 1770 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1730 and/or learned by the learning processor of the AI server, and/or learned by their distributed processing. The processor 1770 may collect history information including the operation contents of the AI device 1700 and/or the user's feedback on the operation, etc. The processor 1770 may store the collected history information in the memory 1760 and/or the learning processor 1730, and/or transmit to an external device such as the AI server. The collected history information can be used to update the learning model. The processor 1770 may control at least some of the components of AI device 1700 to drive an application program stored in memory 1760. Furthermore, the processor 1770 may operate two or more of the components included in the AI device 1700 in combination with each other for driving the application program.

FIG. 18 shows an example of an AI system to which the technical features of the present disclosure can be applied.

Referring to FIG. 18, in the AI system, at least one of an AI server 1820, a robot 1810a, an autonomous vehicle 1810b, an XR device 1810c, a smartphone 1810d and/or a home appliance 1810e is connected to a cloud network 1800. The robot 1810a, the autonomous vehicle 1810b, the XR device 1810c, the smartphone 1810d, and/or the home appliance 1810e to which the AI technology is applied may be referred to as AI devices 1810a to 1810e.

The cloud network 1800 may refer to a network that forms part of a cloud computing infrastructure and/or resides in a cloud computing infrastructure. The cloud network 1800 may be configured using a 3G network, a 4G or LTE network, and/or a 5G network. That is, each of the devices 1810a to 1810e and 1820 consisting the AI system may be connected to each other through the cloud network 1800. In particular, each of the devices 1810a to 1810e and 1820 may communicate with each other through a base station, but may directly communicate with each other without using a base station.

The AI server 1820 may include a server for performing AI processing and a server for performing operations on big data. The AI server 1820 is connected to at least one or more of AI devices constituting the AI system, i.e. the robot 1810a, the autonomous vehicle 1810b, the XR device 1810c, the smartphone 1810d and/or the home appliance 1810e through the cloud network 1800, and may assist at least some AI processing of the connected AI devices 1810a to 1810e. The AI server 1820 can learn the ANN according to the machine learning algorithm on behalf of the AI devices 1810a to 1810e, and can directly store the learning models and/or transmit them to the AI devices 1810a to 1810e. The AI server 1820 may receive the input data from the AI devices 1810a to 1810e, infer the result value with respect to the received input data using the learning model, generate a response and/or a control command based on the inferred result value, and transmit the generated data to the AI devices 1810a to 1810e. Alternatively, the AI devices 1810a to 1810e may directly infer a result value for the input data using a learning model, and generate a response and/or a control command based on the inferred result value.

Various embodiments of the AI devices 1810a to 1810e to which the technical features of the present disclosure can be applied will be described. The AI devices 1810a to 1810e shown in FIG. 18 can be seen as specific embodiments of the AI device 1700 shown in FIG. 17.

The present disclosure can have various advantageous effects.

For example, a UE may apply a measurement configuration based on a variation of a signal quality for a serving cell so that the UE can flexibly adjust a measurement rule based on how fast the UE moves toward/away from the center of the serving cell.

For example, a UE can flexibly adjust a measurement rule based on a serving cell RSRP variation, which may reflect the variation of a distance between the UE and the serving cell. By adjusting the measurement rule, the UE can relax or tighten the measurement rule even if the serving cell quality is below a certain threshold (e.g., s-MeasureConfig).

For example, a UE may be provided with a plurality of measurement configurations so that the UE can flexibly select a measurement configuration among the plurality of measurement configurations based on a specific condition for the UE (e.g., variation of a signal quality for a serving cell, or how fast the UE moves toward/away from the center of the serving cell).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device comprising:
   receiving measurement configurations from a network, each of the measurement configurations mapping to a corresponding signal quality range;
   measuring a first signal quality for a serving cell at a first time point and a second signal quality for the serving cell at a second time point after the first time point;
   identifying a signal quality range to which a difference between the first signal quality and the second signal quality belongs;
   performing a measurement based on a measurement configuration mapped to the identified signal quality range;
   obtaining measurement results related to the measurement; and
   transmitting, to the network, a measurement report comprising the measurement results,
   wherein each of the measurement configurations comprises a measurement identifier (ID),
   wherein the measurement ID is related to a measurement object and a report configuration,
   wherein the measurement object comprises at least one of a measurement frequency or a list of cells,
   wherein the report configuration comprises a report condition,
   wherein the measurement is performed on the measurement object,
   wherein the measurement report is transmitted based on the report configuration,
   wherein the measurement result comprise at least one reference signal received power (RSRP) value,
   wherein the measurement configurations comprise a first measurement configuration mapped to a first signal quality range, and a second measurement configuration mapped to a second signal quality range higher than the first signal quality range, and
   wherein:
   a measurement period related to the second measurement configuration is longer than that related to the first measurement configuration,
   a measurement gap related to the second measurement configuration is shorter than that related to the first measurement configuration; or
   a measurement gap repetition period related to the second measurement configuration is longer than that related to the first measurement configuration.

2. The method of claim 1, wherein the second time point is a time point at which a signal quality for the serving cell is to be measured right after the first signal quality is measured.

3. The method of claim 1, wherein the second time point is a time point after a first time duration starting from the first time point has passed,
   wherein the first time duration is a minimum allowed time interval between the first time point and a time point at which a signal quality for the serving cell is to be measured after the first signal quality is measured, and
   wherein the first time duration is provided by the network.

4. The method of claim 1, wherein the second time point is within a second time duration starting from the first time point, and
   wherein the second time duration is provided by the network.

5. The method of claim 4, wherein the second time duration is a maximum allowed time interval between the first time point and a time point at which a signal quality for the serving cell is to be measured after the first signal quality is measured.

6. The method of claim 1, wherein the second time point is a time interval away from the first time point, and
   wherein the time interval is provided by the network.

7. The method of claim 1, further comprising:
   receiving, from the network, information for a mapping relationship between each of the measurement configurations and the corresponding signal quality range; and
   identifying the measurement configuration mapped to the signal quality range to which the difference between the first signal quality and the second signal quality belongs based on the mapping information.

8. The method of claim 1, further comprising:
receiving, from the network, information for signal quality ranges, wherein each of the signal quality ranges is mapped to each of the measurement configurations;
identifying the difference between the first signal quality and the second signal quality,
wherein the identifying of the signal quality range comprises identifying the signal quality range to which the identified difference belongs among the signal quality ranges.

9. The method of claim 1, wherein the wireless device moves from an edge of the serving cell to a center of the serving cell.

10. The method of claim 1, wherein the difference between the first signal quality and the second signal quality comprises a value that is obtained by subtracting the first signal quality from the second signal quality.

11. The method of claim 1,
wherein the wireless device moves from a center of the serving cell to an edge of the serving cell.

12. The method of claim 1, wherein the wireless device is in communication with at least one of a user equipment, a network, or autonomous vehicles other than the wireless device.

13. A wireless device in a wireless communication system comprising:
a transceiver;
a memory; and
at least one processor operatively coupled to the transceiver and the memory,
wherein the memory stores instructions that, based on being executed by the at least one processor, perform operations comprising:
receiving measurement configurations from a network, each of the measurement configurations mapping to a corresponding signal quality range;
measuring a first signal quality for a serving cell at a first time point and a second signal quality for the serving cell at a second time point after the first time point;
identifying a signal quality range to which a difference between the first signal quality and the second signal quality belongs;
performing a measurement based on a measurement configuration mapped to the identified signal quality range;
obtaining measurement results related to the measurement; and
transmitting, to the network, a measurement report comprising the measurement results,
wherein each of the measurement configurations comprises a measurement identifier (ID),
wherein the measurement ID is related to a measurement object and a report configuration,
wherein the measurement object comprises at least one of a measurement frequency or a list of cells,
wherein the report configuration comprises a report condition,
wherein the measurement is performed on the measurement object,
wherein the measurement report is transmitted based on the report configuration,
wherein the measurement result comprise at least one reference signal received power (RSRP) value,
wherein the measurement configurations comprise a first measurement configuration mapped to a first signal quality range, and a second measurement configuration mapped to a second signal quality range higher than the first signal quality range, and
wherein:
a measurement period related to the second measurement configuration is longer than that related to the first measurement configuration;
a measurement gap related to the second measurement configuration is shorter than that related to the first measurement configuration; or
a measurement gap repetition period related to the second measurement configuration is longer than that related to the first measurement configuration.

14. A processor for a wireless device in a wireless communication system, wherein the processor is configured to control the wireless device to perform operations comprising:
receiving measurement configurations from a network, each of the measurement configurations mapping to a corresponding signal quality range;
measuring a first signal quality for a serving cell at a first time point and a second signal quality for the serving cell at a second time point after the first time point;
identifying a signal quality range to which a difference between the first signal quality and the second signal quality belongs;
performing a measurement based on a measurement configuration mapped to the identified signal quality range;
obtaining measurement results related to the measurement; and
transmitting, to the network, a measurement report comprising the measurement results,
wherein each of the measurement configurations comprises a measurement identifier (ID),
wherein the measurement ID is related to a measurement object and a report configuration,
wherein the measurement object comprises at least one of a measurement frequency or a list of cells,
wherein the report configuration comprises a report condition,
wherein the measurement is performed on the measurement object,
wherein the measurement report is transmitted based on the report configuration,
wherein the measurement result comprise at least one reference signal received power (RSRP) value,
wherein the measurement configurations comprise a first measurement configuration mapped to a first signal quality range, and a second measurement configuration mapped to a second signal quality range higher than the first signal quality range, and
wherein:
a measurement period related to the second measurement configuration is longer than that related to the first measurement configuration;
a measurement gap related to the second measurement configuration is shorter than that related to the first measurement configuration; or
a measurement gap repetition period related to the second measurement configuration is longer than that related to the first measurement configuration.

* * * * *